US011224826B2

(12) United States Patent
Waldron et al.

(10) Patent No.: US 11,224,826 B2
(45) Date of Patent: Jan. 18, 2022

(54) SYSTEM FOR LIQUID HYDROCARBON DESULFURIZATION

(71) Applicant: Alternative Petroleum Technologies, Inc., Reno, NV (US)

(72) Inventors: Jack Lawrence Waldron, Reno, NV (US); Kylen J. Smith, Reno, NV (US)

(73) Assignee: Alternative Petroleum Technologies Holdings Corp., Auburn, WA (US)

( * ) Notice: Subject to any disclaimer, the term of this patent is extended or adjusted under 35 U.S.C. 154(b) by 0 days.

(21) Appl. No.: 17/183,091

(22) Filed: Feb. 23, 2021

(65) Prior Publication Data
US 2021/0171838 A1 Jun. 10, 2021

Related U.S. Application Data

(62) Division of application No. 16/261,098, filed on Jan. 29, 2019, now Pat. No. 10,927,306.

(60) Provisional application No. 62/623,562, filed on Jan. 30, 2018.

(51) Int. Cl.
| | |
|---|---|
| *B01D 15/00* | (2006.01) |
| *C10G 25/00* | (2006.01) |
| *C10G 25/06* | (2006.01) |
| *C10G 27/12* | (2006.01) |
| *C10G 17/02* | (2006.01) |

(52) U.S. Cl.
CPC ............ *B01D 15/00* (2013.01); *C10G 17/02* (2013.01); *C10G 25/00* (2013.01); *C10G 25/003* (2013.01); *C10G 25/06* (2013.01); *C10G 27/12* (2013.01); *B01D 2251/1065* (2013.01); *B01D 2251/504* (2013.01); *B01D 2251/506* (2013.01); *B01D 2251/70* (2013.01); *B01D 2252/10* (2013.01); *C10G 2300/1037* (2013.01); *C10G 2300/202* (2013.01)

(58) Field of Classification Search
None
See application file for complete search history.

(56) References Cited

U.S. PATENT DOCUMENTS 6,402,940 B1 * 6/2002 Rappas .................. C10G 27/12
208/240

* cited by examiner

*Primary Examiner* — Derek N Mueller
(74) *Attorney, Agent, or Firm* — The Watson IP Group, PLC; Jovan N. Jovanovic

(57) ABSTRACT

A liquid hydrocarbon desulfurization system having at least one processing unit, and preferably an initial and an end processing unit. Each processing unit having a reactor assembly and a sorption system. An aqueous system directs aqueous into the reactor assembly together with liquid hydrocarbon, wherein the two are mixed using shear mixers. An adsorbent system provides adsorbent to the sorption column to adsorb the oxidized sulfur resulting through the mixing of the liquid hydrocarbon with the aqueous. A system having multiple processing units is disclosed, as well as systems for transferring adsorbent and providing aqueous. A plurality of methods is likewise disclosed.

8 Claims, 2 Drawing Sheets

SYSTEM FOR LIQUID HYDROCARBON DESULFURIZATION

CROSS-REFERENCE TO RELATED APPLICATION

This application is a divisional of U.S. patent application Ser. No. 16/261,098 filed Jan. 29, 2019, entitled "Method for Liquid Hydrocarbon Desulfurization", which claims priority from U.S. Pat. App. Ser. No. 62/623,562 filed Jan. 30, 2018, entitled "System and Method for Liquid Hydrocarbon Desulfurization," the entire disclosure of which is hereby incorporated by reference in its entirety.

This application is related to, but does not claim priority from, U.S. Pat. App. Ser. No. 62/471,159 filed Mar. 14, 2017, entitled "System and Method for Liquid Hydrocarbon Desulfurization" and U.S. Pat. App. Ser. No. 62/524,816 filed Jun. 26, 2017, entitled "System and Method for Liquid Hydrocarbon Desulfurization", the entire disclosure of each of the foregoing application is incorporated herein by reference in their entirety.

BACKGROUND OF THE DISCLOSURE

1. Field of the Disclosure

The disclosure relates in general to liquid hydrocarbon desulfurization, and more particularly, to a system and method for the oxidation of sulfur compounds in liquid hydrocarbons.

2. Background Art

Environmental concerns continue to increase with the increased use of hydrocarbon fuels, and have increased considerably with the use of these fuels in areas of the world where environmental regulations may not be as advanced as there are in other global locations.

One pollutant of hydrocarbon fuels is Sulfur, generally found in organic compounds such as thiophenes. Once combusted it becomes oxidized, that, when present in the atmosphere, has several deleterious effects. One of these effects is being a component of acid rain. Traditionally, the sulfur content of liquid hydrocarbons has been reduced by hydro-desulfurization, a process that requires relatively high temperatures and pressures in the presence of hydrogen gas to function economically. However, this technology is relatively costly, time consuming and expensive, which, in turn, limits the ability to rapidly assist countries in reducing Sulfur emissions.

Other methods have been developed for desulfurization. One of which is oxidative desulfurization, and another is bio oxidation. There are also drawbacks with these processes; overall they are promising. Among other drawbacks with oxidative desulfurization, it is difficult to efficiently use the reagents used during the oxidation step. The oxidizer is consumed in the reaction, and is quite costly. While in some systems, the oxidizer can be recycled, it remains difficult. Furthermore, there are operational issues associated with its implementation.

While the prior art is replete with patents directed to oxidative desulfurization, it has remained difficult to develop industrial processes for such innovations. Among other such prior art patents are U.S. Pat. No. 3,163,593 issued to Webster; U.S. Pat. No. 8,574,428 issued to Schucker; U.S. Pat. No. 7,758,745 issued to Cheng; U.S. Pat. No. 7,314,545 issued to Karas; U.S. Pat. No. 7,774,749 issued to Martinie; U.S. Pat. No. 6,596,914 issued to Gore; PCT Pub. No. WO2013/051202 published to Ellis and EP. App. Pub NO. 0482841 issued to Collins. Each of the foregoing patents is incorporated herein in its entirety.

SUMMARY OF THE DISCLOSURE

The disclosure is directed in one aspect of the disclosure to a method of desulfurizing a liquid hydrocarbon. The method comprises the steps of: providing an initial processing unit and an end processing unit, the initial processing unit having an initial reactor assembly and an initial sorption system, the end processing unit having an end reactor assembly, a separator and an end sorption system; feeding a liquid hydrocarbon having a sulfur content into the initial reactor assembly; feeding an aqueous feed into the initial reactor assembly; shear mixing the liquid hydrocarbon and the aqueous feed within the initial reactor assembly, to, in turn, react the aqueous feed with the sulfur content of the liquid hydrocarbon; directing the liquid hydrocarbon and aqueous feed to the initial sorption system; feeding a sorbent into the initial sorption system; adsorbing at least some of the sulfur content that has reacted with the aqueous feed from the liquid hydrocarbon; directing liquid hydrocarbon from the initial sorption system to the end reactor assembly; directing the aqueous feed from the initial sorption system to the end reactor assembly; shear mixing the liquid hydrocarbon and the aqueous feed within the end reactor assembly, to, in turn, react the aqueous feed with the sulfur content of the liquid hydrocarbon; directing the liquid hydrocarbon and the aqueous feed to the separator; separating the liquid hydrocarbon and the aqueous feed from each other in the separator; directing the liquid hydrocarbon from the separator to the end sorption system; feeding a sorbent into the end sorption system; adsorbing at least some of the sulfur content that has reacted with the aqueous feed from the liquid hydrocarbon; and removing the liquid hydrocarbon.

In some configurations, the method further comprises the step of providing additional aqueous feed to the end reactor assembly one of before or during the step of shear mixing in the end reactor assembly.

In some configurations, the method further includes the step of feeding a sorbent into the initial sorption system further comprises the step of: removing the sorbent from the end sorption system; and feeding the removed sorbent from the end sorption system to the initial sorption system.

In some configurations, the steps of removing and feeding occur at predetermined intervals.

In some configurations, the liquid hydrocarbon travels through the system substantially continuously.

In some configurations, the method includes the step of heating the liquid hydrocarbon within the initial sorption system.

In some configurations, the aqueous feed comprises an organic acid, an oxidizer, a strong acid.

In some configurations, the organic acid is selected from the group consisting of: acetic, formic, benzoic, or other acid of the carboxylic family, as well as mixtures of the same.

In some configurations, the oxidizer comprises one of the group consisting of: peroxide, such as hydrogen peroxide or an organic peroxide, such as meta-chloroperoxybenzoic acid, or a solid oxidizer such as Oxone.

In some configurations, the strong acid comprises one of the group consisting of: sulfuric acid and nitric acid.

In some configurations, the sorbent comprises an activated alumina sorbent.

In another aspect of the disclosure, the disclosure is directed to a method of desulfurizing a liquid hydrocarbon. The method comprises the steps of: providing an initial processing unit and an end processing unit, and at least one middle processing unit therebetween, the initial processing unit having an initial reactor assembly and an initial sorption system, the end processing unit having an end reactor assembly, a separator and an end sorption system, and the at least one middle processing unit having a middle reactor assembly and a middle sorption system; feeding a liquid hydrocarbon having a sulfur content into the initial reactor assembly; feeding an aqueous feed into the initial reactor assembly; shear mixing the liquid hydrocarbon and the aqueous feed within the initial reactor assembly, to, in turn, react the aqueous feed with the sulfur content of the liquid hydrocarbon; directing the liquid hydrocarbon and aqueous feed to the initial sorption system; feeding a sorbent into the initial sorption system; adsorbing at least some of the sulfur content that has reacted with the aqueous feed from the liquid hydrocarbon; directing liquid hydrocarbon from the initial sorption system to the at least one middle reactor; directing the aqueous feed from the initial sorption system to the at least one middle reactor; feeding a sorbent into the at least one middle reactor; adsorbing at least some of the sulfur content that has reacted with the aqueous feed from the liquid hydrocarbon; directing liquid hydrocarbon from the at least one middle sorption system to the end reactor assembly; directing the aqueous feed from the at least one middle sorption system to the end reactor assembly; shear mixing the liquid hydrocarbon and the aqueous feed within the end reactor assembly, to, in turn, react the aqueous feed with the sulfur content of the liquid hydrocarbon; directing the liquid hydrocarbon and the aqueous feed to the separator; separating the liquid hydrocarbon and the aqueous feed from each other in the separator; directing the liquid hydrocarbon from the separator to the end sorption system; feeding a sorbent into the end sorption system; adsorbing at least some of the sulfur content that has reacted with the aqueous feed from the liquid hydrocarbon; and removing the liquid hydrocarbon.

In some configurations, the method includes the step of providing additional aqueous feed to at least one of the at least one middle reactor assembly one of before or during the step of shear mixing in the at least one middle reactor assembly.

In some configurations, the liquid hydrocarbon proceeds sequentially from the initial processing unit to the at least one middle processing unit to the end processing unit, while the sorbent proceeds sequentially from the end processing unit, to the at least one middle processing unit to the initial processing unit.

In some configurations, the sulfur content of the liquid hydrocarbon at the initial processing unit is at least 100 ppm and more preferably at least 1500 ppm, and the sulfur content of the liquid hydrocarbon after the end sorption system is below 15 ppm and more preferably below 2 ppm.

In some configurations, the at least one middle processing unit comprises at least two middle processing units positioned sequentially between the initial processing unit and the end processing unit.

In some configurations, the method further comprises the step of heating the liquid hydrocarbon in at least one of the middle sorption systems.

In some configurations, the liquid hydrocarbon is heated to between 40° C. and 95° C., and more preferably to approximately 85° C.

In yet another aspect of the disclosure, the disclosure is directed to a system of liquid hydrocarbon desulfurizing. The system includes an initial processing unit and an end processing unit. The initial processing unit having a reactor assembly and a sorption system. The reactor assembly including a reactor vessel and a recirculatory system structurally configured to recirculate fluid within the reactor vessel. The sorption system having an inlet in fluid communication with the reactor assembly, an inlet for absorbent, and at least one hydrocarbon outlet. The end processing unit having an end reactor, a separator and an end sorption system. The end reactor assembly includes an end reactor vessel and an end recirculatory system structurally configured to recirculate fluid within the end reactor vessel. The separator is in fluid communication with the end reactor assembly. The separator has an outlet for liquid hydrocarbon and an outlet for an aqueous feed. The end sorption system has an inlet in fluid communication with the outlet for liquid hydrocarbon, an inlet for absorbent and an outlet for liquid hydrocarbon. The at least one hydrocarbon outlet of the sorption system is coupled to the end reactor assembly so as to be in fluid communication therewith.

In some configurations, the end sorption system has an outlet for absorbent, which is in fluid communication with the inlet for absorbent of the sorption system of the initial processing unit.

In some configurations, the sorption system includes a heater and the end sorption system includes a heater, the heater structurally configured to raise the temperature of the liquid hydrocarbon therewithin.

In some configurations, the system further includes at least one end processing unit. The end processing unit has at least one middle processing unit having a reactor assembly including a reactor vessel and a recirculatory system structurally configured to recirculate fluid within the reactor vessel, and a sorption system having an inlet in fluid communication with the reactor assembly, an inlet for absorbent, and at least one hydrocarbon outlet. The at least one middle processing unit is positioned between the initial processing unit and the end processing unit.

In some configurations, at least one middle processing unit comprises at least two middle processing units positioned sequentially and between the initial processing unit and the end processing unit.

In some configurations, the recirculatory system of at least one of the initial processing unit and the end processing unit includes a shear mixer.

In some configurations, a flow of liquid hydrocarbon proceeds from the initial processing unit to the end processing unit and a flow of adsorbent proceeds from the end processing unit to the initial processing unit.

In some configurations, the system is structurally configured to continuously direct a flow of liquid hydrocarbon from the initial processing unit to the end processing unit.

BRIEF DESCRIPTION OF THE DRAWINGS

The disclosure will now be described with reference to the drawings wherein.

DETAILED DESCRIPTION OF THE DISCLOSURE

Figure 1:
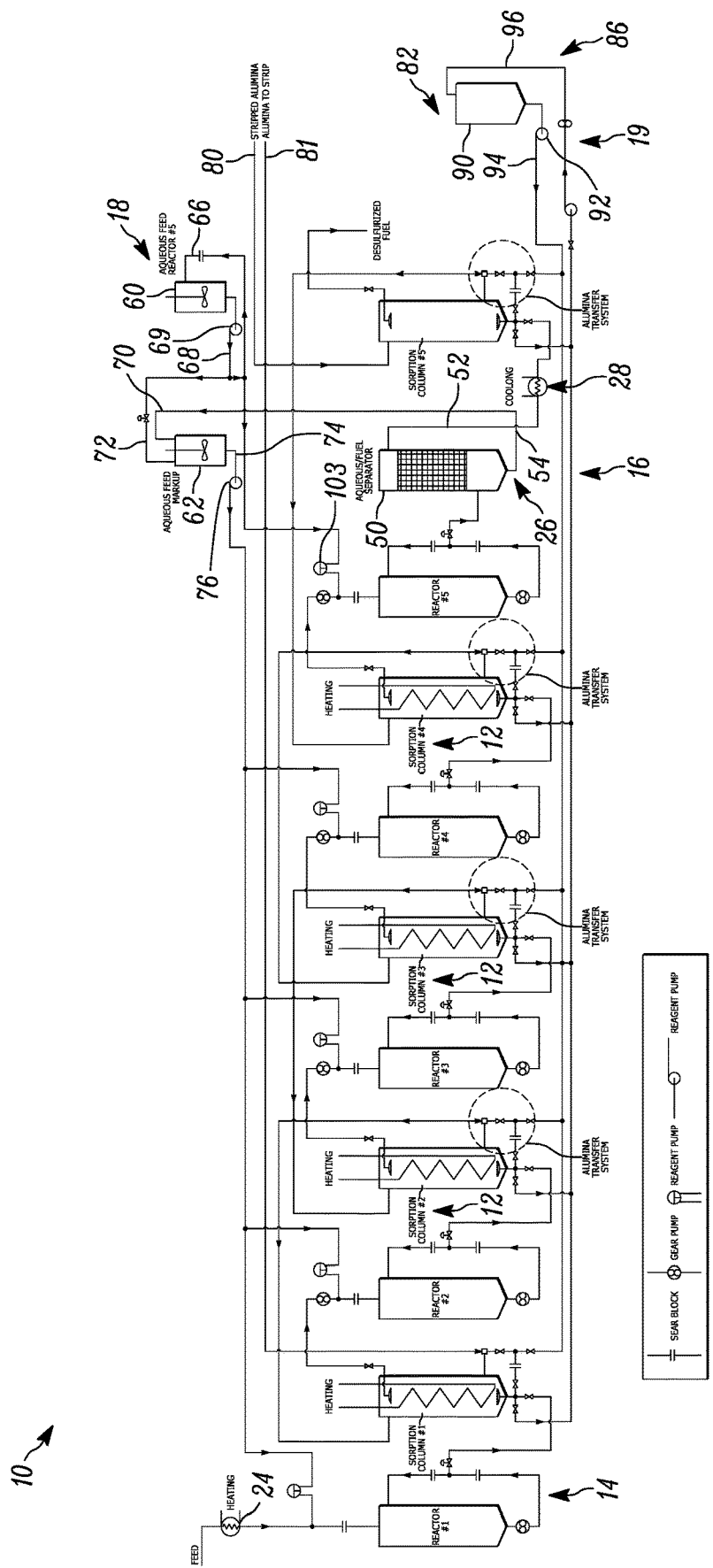
FIG. 1 of the drawings is a schematic representation of a desulfurization system showing five processing units.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, liquid hydrocarbon desulfurization system is shown generally at 10. The desulfurization system is configured to remove sulfur content from liquid hydrocarbons, such as, for example, kerosene, diesel, fuel oil, jet fuel, gasoline, among others. The system is not limited to use with any particular type of liquid hydrocarbon. Additionally, it is contemplated that the system can lower the sulfur content to below 15 ppm, to for example 2 ppm, or less. Often times, the starting hydrocarbon has a sulfur content that can be 1500 or higher, while the system is contemplated for use with starting liquid hydrocarbon that is in excess of 15 ppm, and generally in excess of 100 ppm, 200 ppm, 300 ppm, 400 ppm, 500 ppm, 600 ppm, 700 ppm, 800 ppm, 900 ppm, and on upwards of 1500 ppm or greater. Again, the system is not limited to use with any particular hydrocarbon, or a hydrocarbon with any particular sulfur content.

The processing unit utilizes an aqueous feed. The aqueous feed may comprise any number of different formulations. In some configurations, the aqueous feed may comprise an organic acid, an oxidizer, a strong acid and, optionally, an ionic liquid. The particular ratios can be varied depending on the particular fuel type and the composition thereof. The organic acid may comprise any one of the following, without limitation, acetic, formic, benzoic, or other acid of the carboxylic family, as well as mixtures of the same. The oxidizer may include peroxide which can be hydrogen peroxide or an organic peroxide, such as meta-chloroperoxybenzoic acid, or a solid oxidizer such as Oxone. The strong acid can be either sulfuric or nitric. The foregoing are not exhaustive, but are illustrative examples. The disclosure is not limited to these particular acids. Additionally, it is contemplated that an ionic liquid may be fully omitted from some configurations. Additionally, the processing unit utilizes an activated alumina adsorbent. It is further contemplated that liquid adsorbents can be utilized with the system.

The desulfurization system includes a processing unit, such as processing unit 12, aqueous system 18 and transfer system 19. It will be understood that the system is shown with five processing units, while it is contemplated that a greater or lesser number of processor units may be required to achieve the desired reduction of sulfur content from the liquid hydrocarbon. In the configuration shown, there is an initial processing unit 14, and an end processing unit 16, with three processing units 12 therebetween. The system is configured for continuous desulfurization of liquid hydrocarbons, while it is contemplated that the system can be adapted to a batch process. It is contemplated that the system disclosed can process at a rate of 10 gallons per minute and can reduce the sulfur content from approximately 1500 ppm to less than 15 ppm. Of course, the system can be scaled larger or smaller, and can be configured to have different reductions in sulfur content, as well as different starting sulfur content and ending content. Additionally, the system can be configured to handle a number of other liquid hydrocarbons which may require variation to the system.

Figure 2:
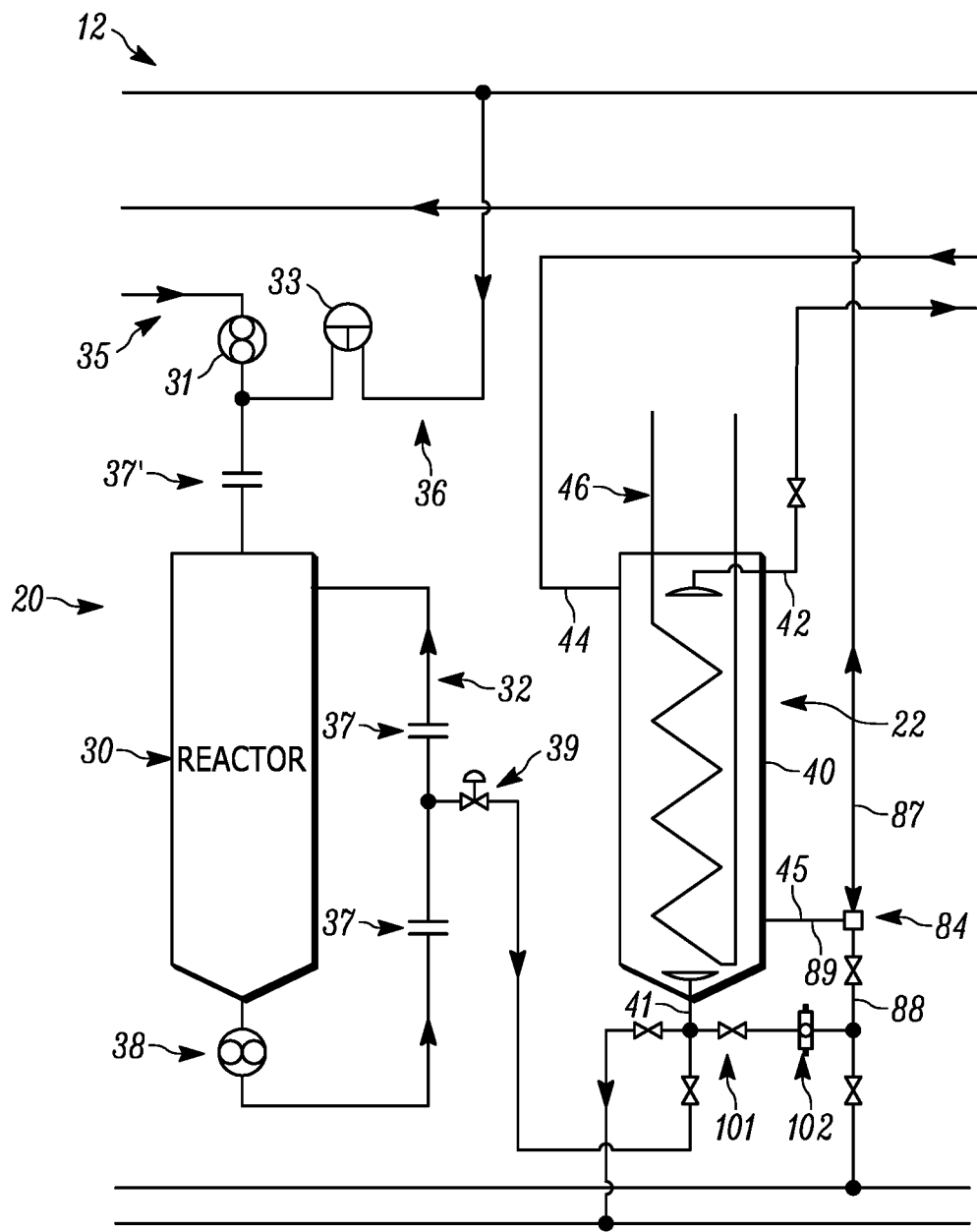
FIG. 2 of the drawings is a schematic representation of a single processor unit taken of the desulfurization system.

With additional reference to FIG. 2, the processing units 12 include reactor assembly 20 and sorption system 22. The reactor assembly 20 includes reactor vessel 30, recirculatory 32 and outfeed 34. The reactor vessel comprises fuel infeed 35 and an aqueous infeed 36. In the configuration shown, the reactor vessel comprises a vessel having a capacity of 193 gallons. The recirculatory comprises a pump 38 and a shear mixer 37. The recirculatory takes fluid from the reactor vessel and circulates the same back through the reactor vessel by direction of the pump. The fluid is directed through the shear mixer during circulation. In the configuration shown, the shear mixer may be a shear plate of the type disclosed in U.S. Pat. No. 8,192,073 entitled "Mixing Apparatus and Method for Manufacturing an Emulsified Fuel" issued Jun. 5, 2012, the entire disclosure of which is incorporated herein by reference in its entirety. The outfeed 34 from the reactor assembly 20 comprises a bleed valve 39 which can be configured to maintain a particular amount of fluid within the reactor vessel 30.

The sorption system is shown as comprising sorption column 40 and heater (or cooler in some configurations) 46 positioned within the sorption column. It is desired that the heater maintains the liquid hydrocarbon at an elevated temperature as compared to ambient. In the configuration shown, the heater is configured to maintain a temperature of approximately 85° C. within the sorption column. It is contemplated that depending on the hydrocarbon, the aqueous feed, the transfer system and the sulfur content, among other considerations, the temperature may be desired to be higher or lower than the 85° C. set forth above, for example, at a temperature of between 40° C. and 95° C., while higher and lower temperatures are contemplated. The sorption column 40 includes fuel/aqueous inlet 41, fuel/aqueous outlet 42, adsorbent inlet 44 and adsorbent outlet 45.

As will be discussed in greater detail with respect to the operation of the system, the fuel infeed 35 and the aqueous infeed 36 may meet prior to entry into the reactor vessel 30, such that a single inlet is presented to the reactor vessel. A gear pump 31 (or other pump) may be utilized to direct fuel into the infeed, and a reagent pump 33 (or other pump) may be utilized to direct aqueous to the aqueous infeed 36. A shear mixer 37' may be presented between the joining of the fuel and aqueous infeed and prior to the entry thereof into the reactor vessel.

The recirculatory recirculates fluid at a desired rate. The bleed valve 39 is controlled to direct the outflow therethrough so as to maintain a desired volume of liquid hydrocarbon within the reactor vessel. The outfeed 34 is directed to the fuel/aqueous inlet 41 of the sorption column 40. The fuel/aqueous outlet 42 is positioned on the opposite end of the fuel/aqueous inlet 41 so as to allow the fluid to pass from one end through the other (and beyond the adsorbent that is positioned within the sorption column). The fuel/aqueous outlet is coupled to the subsequent reactor assembly, and in particular to the fuel and aqueous infeed thereof.

It will be understood that a constant flow rate can be directed into the fuel infeed and the aqueous infeed, and the bleed valve can control the volume of liquid hydrocarbon within the reactor vessel, and at a flow rate direct liquid hydrocarbon to the sorption column, such that the system runs continuously.

With reference to FIG. 1, and FIG. 2, the initial processing unit 14, is configured much like that of the remaining processing units, however, there is typically a heater such as heater 24 (FIG. 1) which is positioned prior to the fuel infeed so as to heat the fuel from generally ambient to the desired elevated temperature (in the configuration shown, 85° C.).

Similarly, the end processing unit is configured much like that of the remaining processing units, however, and with reference to FIG. 1, there is typically a separator 26 and a cooler 28 coupled thereto. The separator is configured to separate aqueous from fuel and is positioned between the reactor assembly and the sorption system of that processing unit. The separator 26 includes infeed 50, fuel outlet 52 and aqueous outlet 54. The infeed 50 receives fuel/aqueous from the reactor vessel, and the fuel outlet 52 is directed to the sorption system 22. In the configuration shown, cooler 28 is positioned on the fuel outlet between the separator 26 and the sorption column. The aqueous outlet is directed to the aqueous system. The sorption system of the end processing unit does not typically include a heater, rather the cooler is used to return the temperature of the liquid hydrocarbon back to or toward ambient temperature. In some configurations, the separator may be omitted wherein a reagent dosages at the end processing unit have different (i.e., lower) requirements.

The aqueous system 18 is shown in FIG. 1 as including aqueous feed mixer 60 and aqueous feed makeup 62. The aqueous feed mixer includes inlet 66, outlet 68 and pump 69. The inlet includes recirculation, and may be connected to another tank for receiving further new aqueous. The outlet of the aqueous feed mixer is coupled to the aqueous infeed of the end processing unit 16. Additional aqueous can be added to the aqueous feed mixer (or to the aqueous feed makeup.

The aqueous feed makeup 62 includes separator inlet 70, reactor inlet 72, outlet 74 and pump 76. The separator inlet 70 is coupled to the aqueous outlet 54 of the separator. The reactor outlet 72 is coupled to the outlet and/or inlet of the aqueous feed mixer so as to selectively direct aqueous to the aqueous infeed of the end processing unit. The outlet 74 of the aqueous feed makeup 62 is directed to the aqueous infeed of each of the remaining reactor vessels, including that of the initial processing unit, and the processing units between the initial processing unit and the end processing unit. A pump may be positioned inline to provide the aqueous to the aqueous infeed of the remaining processing units. It will be understood that reagent pumps may be positioned between the aqueous infeed and the pump to properly meter the aqueous as necessitated or desired.

The transfer system 19 is shown in FIGS. 1 and 2, collectively, as comprising adsorbent supply inlet 80 and adsorbent transfer system 82. The adsorbent supply inlet 80 is directed to the adsorbent inlet of the end processing unit. The adsorbent transfer system 82 includes, at each of the processing units, jet pump 84 and motive fluid system 86. With reference to FIG. 2, the jet pump 84 includes outlet 87, motive fluid inlet 88 and adsorbent inlet 89. The jet pump functions using the venture principle so as to direct adsorbent from within the respective sorption system through the adsorbent outlet 45 of the sorption column, into the adsorbent inlet 89, while directing motive fluid from the motive fluid system into the motive fluid inlet 88 to pull the solid absorbent from within the sorption system. The pulled solid adsorbent and the motive fluid is then directed into the adsorbent inlet of a preceding processing unit, with the exception of the initial processing unit. In the case of the initial processing unit, the pulled solid adsorbent and the motive fluid is then directed to the alumina supply outlet 81.

The motive fluid system 86 includes motive fluid tank 90 and motive fluid pump 92. The motive fluid tank includes motive fluid outlet 94 and motive fluid inlet 96. Motive fluid can additionally be provided through valve 101, whose flowrate can be controlled by orifice 102. The motive fluid provides the driving fluid that creates the vacuum to pull the solid adsorbent from within the sorption column through the adsorbent outlet of the sorption column. In the configuration contemplated, the motive fluid comprises a liquid hydrocarbon. Preferably, the motive fluid has a sulfur content that is lower than that of the fluid entering the desulfurization system, and preferably at, near or lower than that of the desired output sulfur level after processing by the system. It will be understood that the transfer system shown in the configuration described is merely one configuration. One of skill in the art could envision other such systems, such as those use impeller pumps, as well as other structures and equipment to effectuate movement of the material.

In operation, the system is started up. Initially, a number of different mechanisms can be utilized to reach an initial steady state operation. In particular, the system may start with adsorbent in each of the sorption columns, the heaters turned on to the desired temperature and the desired aqueous feed being directed to each of the processing units. It will be understood that the starting conditions can be achieved through a number of different processes, methods and steps.

Once initiated, eventually a steady state operation is achieved. In the configuration shown, the fuel infeed to the initial processing unit is set at a desired rate. At such a rate, and with a liquid hydrocarbon wherein the sulfur content is known, the appropriate amount of aqueous that is to be directed into each reactor assembly can be determined through calculation. Additionally, with the known feed rate, the bleed valves of each of the processing units can be controlled to maintain a certain level of liquid hydrocarbon within each of the reactor vessels.

From here, we can describe the movement of each of the three moving liquids and solids through the system. Namely, this includes the liquid hydrocarbon, aqueous and adsorbent. The liquid hydrocarbon is proceeding through the processing units, sequentially, from the initial processing unit to the end processing unit. The aqueous proceeds through the reactor assembly by proceeding to the reactor vessel of the end processing unit, and from there being distributed (with any required makeup or additional aqueous) to each of the processing units prior to the end processing unit substantially simultaneously. The adsorbent proceeds to the sorption column of the end processing unit, and is moved sequentially from the end processing unit, to the initial processing unit before being removed for stripping.

In greater detail, the liquid hydrocarbon is introduced into the fuel infeed of the reactor vessel of the initial processing unit. It is mixed with aqueous and introduced into the reactor vessel of the initial processing unit. It is circulated by the recirculatory, wherein the mix of the aqueous and the liquid hydrocarbon is achieved by the shear mixers. The introduction is continuous as is the recirculation. It is contemplated that on average, in the configuration shown, the mixture is recirculated within the reactor vessel for approximately fifteen minutes (again, exemplary and not to be deemed a limiting time of recirculation). The bleed valve directs the liquid hydrocarbon and the aqueous mixture into the sorption column of the initial processing unit through the fuel/aqueous inlet. The mixture is pushed through the adsorbent wherein the oxidized sulfur is adsorbed and the reagent are absorbed. The absorbed aqueous allows for continued oxidation to occur in the sorbent bed formed by the adsorbent (alumina in the configuration shown). The liquid hydrocarbon and aqueous proceeds through the fuel outlet and into the fuel infeed of the subsequent processing unit. Additional aqueous is provided through the infeed.

The process repeats with each subsequent processing unit. At the end processing unit, initially, the liquid hydrocarbon and aqueous is directed into the reactor vessel of the end processing unit, with additional aqueous added. As with the prior units, the mixture is recirculated and directed through shear mixers. The bleed valve directs the liquid hydrocarbon and aqueous mixture into the separator 26. At the separator, the aqueous is separated from the liquid hydrocarbon, and the aqueous (that was injected into the reactor vessel of the end processing unity by reagent pump 103 is removed through the aqueous outlet and transmitted to the aqueous feed makeup. The liquid hydrocarbon is then directed into the sorption column and through the fuel/aqueous inlet (although at this point there should be little to no aqueous mixed with the liquid hydrocarbon). The liquid hydrocarbon is directed beyond the adsorbent and out of the fuel/aqueous outlet of the sorption column of the end processing unit. At this point, the liquid hydrocarbon is generally free of any aqueous, a substantial majority of the sulfur has been oxidized, and the liquid hydrocarbon is ready for utilization. In the configuration shown, sulfur content can be reduced below 15 ppm.

The adsorbent has a generally reverse movement from the end processing unit to the initial processing unit. That is, once steady state operation is achieved, the adsorbent in each of the processing units is removed therefrom through the adsorbent transfer system, and directed into the immediately preceding sorption column through the adsorbent inlet. The adsorbent in the initial processing unit is removed and sent through the adsorbent supply outlet for stripping or for disposal. Fresh and/or stripped adsorbent is directed from the adsorbent supply inlet through the adsorbent inlet of the sorption column and into the sorption column of the end processing unit. This process, in the configuration shown, is not a continuous process, but is repeated at predetermined time intervals. In the configuration shown, the adsorbent is cycled according to the above process every four hours. It is contemplated that the time interval may be altered from the four hours and the four hours is merely exemplary. The cycle may repeat multiple times in an hour, or as few as only ever several hours or days. The cycle is repeated based upon a number of factors, including, but not limited to the sulfur content, the flow rates, the adsorbent used, the particular hydrocarbon, the nature of the sulfur content, the type of aqueous utilized, among other considerations. It is further contemplated that the process may be done continuously as well.

It will be understood that in some applications only two or three processing units will be required, whereas in other configurations in excess of five may be required. Wherein processing occurs at a 10 gallon/minute rate of a liquid hydrocarbon having 1500 ppm, the system is sized so as to occupy the space of approximately two shipping containers. Of course, this is merely exemplary and it is contemplated that the system can be scaled smaller or larger, and can accommodate different liquid hydrocarbons, at different flow rates, with different sulfur content, as well as different adsorbent and different aqueous.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A system for liquid hydrocarbon desulfurizing comprising:
    an initial processing unit, the initial processing unit having
        a reactor assembly including a reactor vessel and a recirculatory system structurally configured to recirculate fluid within the reactor vessel;
        a sorption system having an inlet in fluid communication with the reactor assembly, an inlet for absorbent, and at least one hydrocarbon outlet;
    an end processing unit, the end processing unit having
        an end reactor assembly including an end reactor vessel and an end recirculatory system structurally configured to recirculate fluid within the end reactor vessel;
        a separator in fluid communication with the end reactor assembly, the separator having an outlet for liquid hydrocarbon and an outlet for an aqueous feed; and
        an end sorption system having an inlet in fluid communication with the outlet for liquid hydrocarbon, an inlet for absorbent and an outlet for liquid hydrocarbon,
    wherein the at least one hydrocarbon outlet of the sorption system is coupled to the end reactor assembly so as to be in fluid communication therewith.

2. The system of claim 1, wherein the end sorption system has an outlet for absorbent, which is in fluid communication with the inlet for absorbent of the sorption system of the initial processing unit.

3. The system of claim 1, wherein the sorption system includes a heater and the end sorption system includes a heater, the heater structurally configured to raise the temperature of the liquid hydrocarbon therewithin.

4. The system of claim 1, further comprising at least one middle processing unit having a reactor assembly including a reactor vessel and a recirculatory system structurally configured to recirculate fluid within the reactor vessel, and a sorption system having an inlet in fluid communication with the reactor assembly, an inlet for absorbent, and at least one hydrocarbon outlet, the at least one middle processing unit being positioned between the initial processing unit and the end processing unit.

5. The system of claim 4, wherein at least one middle processing unit comprises at least two middle processing units positioned sequentially and between the initial processing unit and the end processing unit.

6. The system of claim 1, wherein the recirculatory system of at least one of the initial processing unit and the end processing unit includes a shear mixer.

7. The system of claim 1, wherein a flow of liquid hydrocarbon proceeds from the initial processing unit to the end processing unit and a flow of adsorbent proceeds from the end processing unit to the initial processing unit.

8. The system of claim 1, wherein the system is structurally configured to continuously direct a flow of liquid hydrocarbon from the initial processing unit to the end processing unit.

\* \* \* \* \*